United States Patent [19]
Goller et al.

[11] Patent Number: 6,094,013
[45] Date of Patent: Jul. 25, 2000

[54] CIRCUIT ARRANGEMENT FOR LIMITING THE CURRENT AT MAKE FOR A TRANSFORMER

[75] Inventors: Hugo Goller, Munich; Klaus Hoffmann, Bad Toelz Ellbach, both of Germany

[73] Assignee: Siemens Aktiengesellschaft, Munich, Germany

[21] Appl. No.: 09/203,047

[22] Filed: Dec. 2, 1998

[30] Foreign Application Priority Data

Jul. 24, 1998 [DE] Germany .......................... 198 33 412

[51] Int. Cl.⁷ .................................................. H05B 41/16
[52] U.S. Cl. ......................... 315/282; 315/279; 315/224; 361/57; 361/112; 361/102
[58] Field of Search ................. 361/57, 115, 102, 361/24, 91, 58, 106; 315/224, 279, 254, 276, 278, 207, 282; 219/546

[56] References Cited

U.S. PATENT DOCUMENTS

| | | | |
|---|---|---|---|
| 3,809,985 | 5/1974 | Krause et al. .......................... 318/490 |
| 4,414,601 | 11/1983 | Conroy, Jr. ............................... 361/97 |
| 5,530,613 | 6/1996 | Bauer et al. ............................. 361/58 |

*Primary Examiner*—Haissa Philogene
*Attorney, Agent, or Firm*—Hill & Simpson

[57] ABSTRACT

A circuit arrangement for limiting the current at make for a transformer wherein, in order to avoid the current peak at make when switching a transformer on, resistors are connected between operating voltage and the primary winding of the transformer. A test winding at the secondary side of the transformer is connected via a rectifier to the supply input of a contactor, so that the switches of the contactor close after the transformer is turned on and the resistors therefore no longer lie between operating voltage of the primary winding. PTC-resistors connected in series with the resistors assure that the resistors are not overloaded by the high-operating current of the transformer if the switches do not switch.

4 Claims, 2 Drawing Sheets

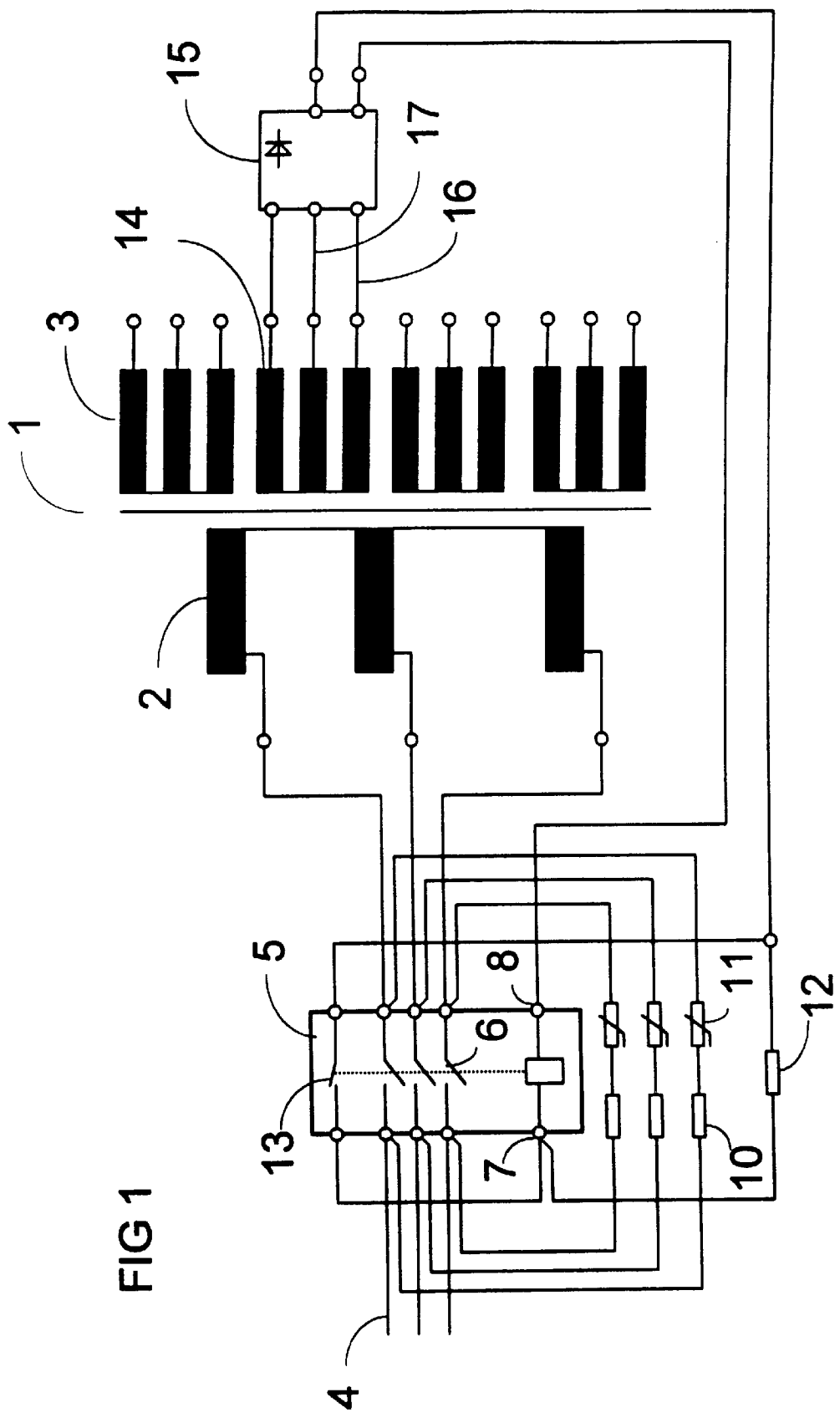

CIRCUIT ARRANGEMENT FOR LIMITING THE CURRENT AT MAKE FOR A TRANSFORMER

BACKGROUND OF THE INVENTION

1. Field of the Invention

The present invention relates to a simple circuit arrangement for limiting the current at make for transformers which only makes the full operating voltage available after a function check of the transformer.

2. Description of the Prior Art

For a brief moment after turn-on, a transformer loads a current source only with the ohmic part of the wire resistor of the transformer's primary winding. The current peak at make is all the higher the lower the impedance of the primary winding. Further, this current peak is all the wider, i.e. all the higher in energy, the larger the iron core to be magnetized. As a result, the main voltage can collapse or fuses can respond. The current at make must, therefore, be limited.

Methods are known to arrange the ohmic impedances between the input of the primary winding of the transformer and the current source so that the current at make is reduced. After turn-on, these resistors lead to the undesired result that an additional voltage drop-off occurs at them. Moreover, the resistors become heated during operation and can be destroyed due to the development of such heat.

Over and above this, it is known to bridge the resistors after a permanently predetermined time, after which one assumes an adequate pre-magnetization of the transformer. For example, the bridging occurs with a time-controlled relay. Due to the fixed time prescription, however, a function check of the transformer is lacking. As such, a main voltage collapse can still occur after the permanently predetermined time in case of a short in the transformer.

Accordingly, an object of the present invention is to specify a simple circuit arrangement for limiting the current at make for transformers that only makes the full operating voltage available after a function check of the transformer.

SUMMARY OF THE INVENTION

Such object is achieved in accordance with the teachings of the present invention wherein, via a test winding at the secondary side of the transformer, a check is first carried out to see whether the transformer has switched on. Given successful activation, a contactor between operating voltage source and transformer switches and the resistors are bridged. In addition, PTC resistors are provided that, given failure of the contactor circuit, see to it that the resistors are not over-loaded.

In an embodiment of the present invention, given a secondary winding of multi-phase turns, a rectifier follows the test winding.

In another embodiment of the present invention, the response voltage for the contactor also can be derived from a single-phase winding. The rectifier is then illuminated given a drive with alternating voltage.

In a further embodiment of the present invention, an optimum drive voltage for the contactor is set by an auxiliary contact that initially bridges the further resistor upon turn-on and is then interrupted after the response of the contactor.

Additional features and advantages of the present invention are described in, and will be apparent from, the Detailed Description of the Preferred Embodiments and the Drawings.

DESCRIPTION OF THE DRAWINGS

FIG. 1 shows a circuit arrangement for limiting the current at make for a transformer.

DETAILED DESCRIPTION OF THE PREFERRED EMBODIMENTS

Figure 2A:
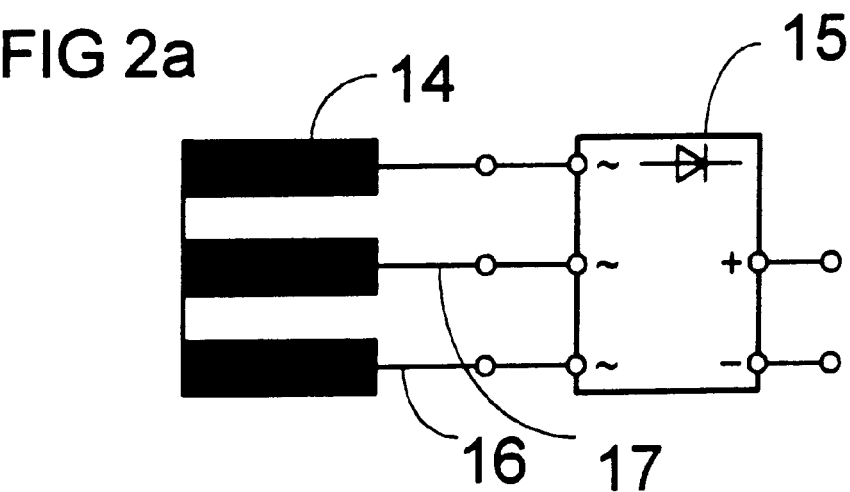
FIGS. 2a–2c shows various embodiments of the present invention for determining a response voltage for the contactor from a test winding of the secondary side of the transformer.

FIG. 1 shows how a transformer 1 having a primary winding 2 and a secondary side 3 is connected to an operating voltage 4. A contactor 5 whose switches 6 are open before turn-on is thereby connected between the operating voltage 4 and the primary winding 2. The switches 6 close only given the application of a supply voltage at both the supply input 7 of the contactor 5 and the supply output 8 of the contactor 5, so that the operating voltage 4 is adjacent at the primary winding 2. When the switches 6 are open, the current (after the activation of the operating voltage 4) flows over the resistors 10 connected parallel to the contactor 5 and over the PTC-resistors 11 respectively connected in series therewith. Resistor that exhibits a positive temperature coefficient (PTC) thereby serve as the PTC-resistors 11. The impedance thereby increases with increasing temperature of the PTC-resistors 11. The resistors 10 limit the current at make, which must be selected at least high enough that an induced voltage can build up at the secondary side at a test winding 14 of the transformer 1. A selected secondary winding can thereby serve as test winding 14. The test winding 14 includes at least two terminals 16, 17 connected to a rectifier 15 which is, in turn, connected to both the supply input 7 of the contactors and a further resistor 12. The induced voltage is applied to the supply input 7 of the contactor 5 via the further resistor 12. When this voltage exceeds the switching threshold of the contactor 5, the current paths of the switch contacts 6 bridge the resistors 10 and the PTC-resistors 11. The current limitation is thus suppressed and the transformer 1 can be loaded. Simultaneously with the bridging of the current limitation, an auxiliary contact 13 interrupts the bridge via the further resistor 12 and thus sets the optimum drive voltage for continuous operation of the contactor 5.

When the contactor 5 does not switch due to a malfunction (line break, etc.), the PTC-resistors 11, connected in series with the resistors 10, heat up. This then becomes high-impedance and throttles the current down to a small residual current, just enough that the PTC-resistors 11 remain hot and, thus, high-impedance. The resistors 10 are thus protected against overload. This residual current, however, is not enough to magnetize the transformer 1. An actuation of envisioned users is impossible given this malfunction.

As shown in FIG. 2a, the secondary winding is three-phase.

Figure 2B:
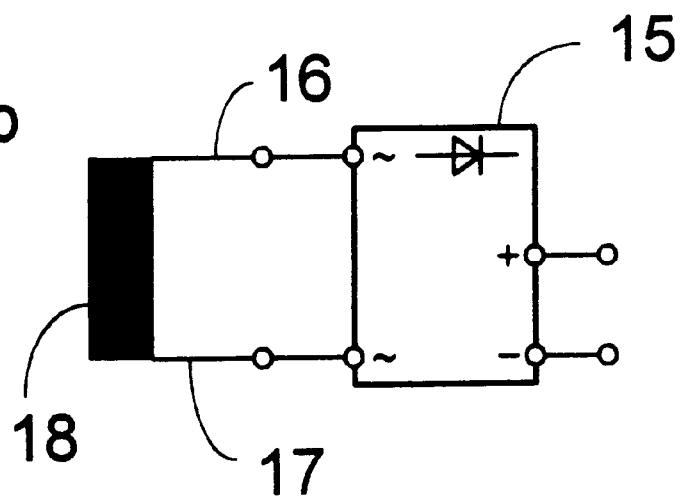

As shown in FIG. 2b, the response voltage for the contactor 5 also can be derived from a single-phase winding 18.

Figure 2C:
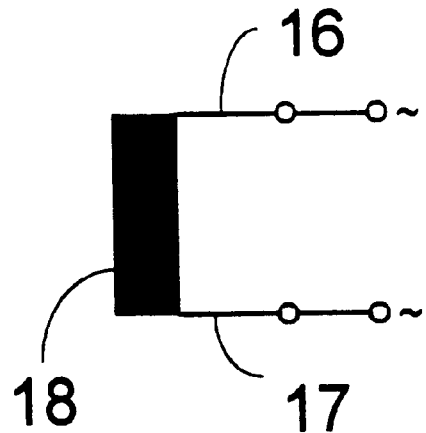

As shown in FIG. 2c, the response voltage for the contactor 5 also can be derived from a single-phase winding 18 wherein, in addition, the rectifier 15 is then eliminated given a drive with alternating voltage.

The circuit arrangement of the present invention thus assures that the current at make for a transformer is reduced and resistors provided therefor are not overloaded.

Although the present invention has been described with reference to specific embodiments, those of skill in the art will recognize that changes may be made thereto without departing from the spirit and scope of the invention as set forth in the hereafter appended claims.

We claim as our invention:

1. A circuit arrangement for limiting the current at make for a transformer, comprising:

a contactor to whose inputs an operating voltage for the transformer is applied and whose outputs are connected to primary windings of the transformer;

series-connected ohmic resistors connected parallel to the contactor;

PTC-resistors connected parallel to the contactor;

a test winding at a secondary side of the transformer having at least first and second terminals;

a further resistor connected between the first terminal of the test winding and a supply input of the contactor; and a supply output connected to the second terminal of the test winding.

2. A circuit arrangement as claimed in claim 1, further comprising:

a rectifier connected between the first and second terminals of the test winding and the further resistor.

3. A circuit arrangement as claimed in claim 1, wherein the test winding is formed as a single-phase winding.

4. A circuit arrangement as claimed in claim 1, further comprising:

an auxiliary contact in the contactor, the auxiliary contact connected parallel to the further resistor and connected to switches of the contactor wherein the auxiliary contact is closed when the switches are open, and the auxiliary contact is open when the switches are closed.

* * * * *